(12) United States Patent
Tuncer

(10) Patent No.: US 8,733,316 B2
(45) Date of Patent: May 27, 2014

(54) ROTATING INTERNAL COMBUSTION ENGINE

(76) Inventor: Yilmaz Yasar Tuncer, Istanbul (TR)

( * ) Notice: Subject to any disclaimer, the term of this patent is extended or adjusted under 35 U.S.C. 154(b) by 1100 days.

(21) Appl. No.: 12/670,318

(22) PCT Filed: Nov. 25, 2008

(86) PCT No.: PCT/TR2008/000135
§ 371 (c)(1),
(2), (4) Date: Jan. 22, 2010

(65) Prior Publication Data
US 2010/0192904 A1 Aug. 5, 2010

(30) Foreign Application Priority Data

Aug. 4, 2008 (TR) .............................. a 2008 05753

(51) Int. Cl.
*F02B 53/04* (2006.01)

(52) U.S. Cl.
USPC ............. 123/240; 123/243; 123/236; 418/13; 418/259; 418/260; 418/261

(58) Field of Classification Search
USPC ............ 123/240, 243, 236; 418/13, 259, 260, 418/261
See application file for complete search history.

(56) References Cited

U.S. PATENT DOCUMENTS

| 2,215,232 A * | 9/1940 | De Witt ......................... 123/243 |
| 2,897,798 A * | 8/1959 | Benton .......................... 123/233 |
| 3,230,938 A * | 1/1966 | Hojnowski .................... 123/240 |
| 3,595,210 A | 7/1971 | Lampis |
| 3,682,143 A * | 8/1972 | Leas .............................. 123/240 |
| 3,818,886 A | 6/1974 | Blaszczynski |
| 3,976,037 A | 8/1976 | Hojnowski |
| 4,023,540 A * | 5/1977 | Zollenkopf ................... 123/240 |
| 4,401,070 A * | 8/1983 | McCann ....................... 123/229 |
| 4,540,356 A | 9/1985 | Wankel |
| 5,284,426 A * | 2/1994 | Strikis et al. ...................... 418/6 |
| 5,472,327 A * | 12/1995 | Strikis et al. ..................... 418/15 |
| 5,865,152 A * | 2/1999 | Murphy et al. ............... 123/237 |
| 6,539,913 B1 * | 4/2003 | Gardiner ....................... 123/231 |
| 7,395,805 B1 * | 7/2008 | MacMurray ................. 123/241 |
| 2004/0094101 A1 * | 5/2004 | Viitamaki .................... 123/18 R |
| 2006/0073051 A1 * | 4/2006 | Hwang et al. .................. 418/29 |

FOREIGN PATENT DOCUMENTS

| CA | 637089 A | 2/1962 | |
| DE | 10203731 A1 * | 7/2003 | ............. F01C 1/344 |
| GB | 2086479 A * | 5/1982 | ............. F01C 1/344 |
| GB | 2094890 A * | 9/1982 | ............. F01C 1/344 |
| GB | 2183732 A * | 6/1987 | ............. F01C 1/344 |
| WO | WO 8707675 A1 * | 12/1987 | ............. F01C 21/08 |
| WO | WO 9404794 A1 * | 3/1994 | ............. F01C 1/344 |

* cited by examiner

*Primary Examiner* — Thomas Denion
*Assistant Examiner* — Patrick Maines
(74) *Attorney, Agent, or Firm* — Akerman LLP

(57) ABSTRACT

The invention is an internal combustion engine converting the fuel/air mixture (17) to energy, comprising at least one engine having at least one engine cover (2), at least one external piston (5) having geared rotary ducts and providing the combustion and compression volumes inside said engine body (1), having fuel/air mixture (17) and exhaust gas (18) discharge openings (4.1), one internal piston (7) which rotates inside said internal piston space (6) and compresses the fuel/air mixture (17) sucked in through the suction opening (6.1) behind it and pumps this into the external piston inner space (4) and an external piston (5) rotating in the opposite direction.

14 Claims, 9 Drawing Sheets

ROTATING INTERNAL COMBUSTION ENGINE

TECHNICAL FIELD

The invention relates to multi-cylinder internal combustion ignition engines used in land, sea and air vehicles.

The invention relates in particular to a lightweight engine having higher throughput and performance rather than in-line type, v, boxer, wankel and similar engine types.

BACKGROUND OF THE INVENTION

Various engine embodiments have been implemented to increase the performance and throughput of multi-cylinder, internal combustion ignition engines used in land, sea and air vehicles. In-line type and v types are those which are most prevalently known and used among the engines in question. Apart form these types, engine types such as wankel and boxer are also used. The primary operation principle in ignition engines is based on four stroke ignition. A piston, cylinder, combustion chamber, valve, crank mechanisms are standard components. Among multi-cylinder engines, in-line cylinder type engines are among the types which are by far the most worked on. Cylinders in a line, opening to an engine block and the pistons moving in the cylinders, a crank shaft which converts the post combustion motion energy of the pistons to mechanical energy and which comprises all the pistons are its major elements.

V type engines are another engine type. The main principle of such engines is positioning the line cylinders oppositely and at an angle with each other, obtaining the required high power and counterbalancing engine loads acting on the crank shaft. In the event multi-cylinder engines are in-line type, their great space requirement and counterbalancing of heavy mechanical loads are thus provided for in this manner.

Boxer type engines are another engine type. Boxer engine, or as alternatively called the flat engine is an internal combustion engine with pistons parallel to the ground. Such internal combustion engines were developed by Karl Benz. In the boxer engine, cylinders are placed in 2 lines on both sides of the crank shaft and thus it is ensured that the motion of all pistons is on a single plane. That heavy mechanical loads arise in these engine types necessitates an impact resisting shaft like the crank shaft which comprises a cost that is 30% of the engine cost. The fact that the mechanism is complicated, the sensitivity of calculating centers of gravities for a balanced rotation on the shaft, and other mechanical factors are important factors in cost and operation efficiency.

In wankel engines in which centers of gravity are improved by Felix Wankel, on the contrary to the internal combustion engines, the rotating pistons, which are triangular and flattened on the sides, are used. By virtue of transferring the loads via the shaft connected directly on the piston, their structure is less complex than other engines. Applications EP0063240 titled "rotary piston engine", CA637089 titled "rotary piston internal combustion engine", and U.S. Pat. No. 4,540,356 titled "Internal axis crankless rotary piston engine" are examples of Felix Wankel's improvements in this area. Wear occurring on the contact surfaces of the rotating piston is a problem encountered in these engine types. Another problem encountered is high fuel consumption due to not being able to adjust the compression ratio. In order to eliminate such disadvantages, hybrid or hydrogen based engine improvements are currently in progress.

For internal combustion, multi cylinder ignition engines in which fuel oil can be used at 15-20% and diesel fuel can be used at 30%, engine technologies which operate on different principles where mechanical load is minimized and efficiency is increased are being sought.

OBJECT OF THE INVENTION

Based on the state of the art, the object of the invention is to eliminate existing disadvantages through improvements in multi cylinder, internal combustion, ignition engines used in land, sea and air vehicles.

Another object of the invention is to attain a lightweight engine as alternative to the known engine type. Another object of the invention is to obtain more energy from the fuel as the result of combustion. Another object is to achieve an engine with a simple mechanism. In this way, the need for complex engine components is eliminated. Another object of the invention is to provide for the transfer of the movement without requiring a durable crank shaft geometry found in internal combustion engines. In this manner, the crank shaft design that varies based on the number of cylinders is not required. In this manner, varying crank shaft center of weight measurements are not required with the increase in the number of cylinders. Another object of the invention is to obtain an engine by making simple additions according to the mechanical power.

In order to achieve said objects, innovations were made on multi cylinder, internal combustion, ignition, rotating block radial engines used in land, sea and air vehicles, comprising one external block body and at least one piston space, combustion chambers, at least one piston operating inside said block body.

In order to achieve said objects, innovations were made on rotating, internal combustion engines converting fuel/air mixture to energy, having coolant/lubricating fluid flow conduits, cooled with air or oil, comprising at least one ignition engine body and at least one engine cover connected to said engine body.

In a preferred embodiment of the invention, in order to achieve an engine having a smaller volume and weight and providing higher efficiency, at least one external piston inner space was formed in said engine providing the combustion and exhaust discharge volumes and having geared rotation channels. In a preferred embodiment of the invention, at least one internal was formed which provides the combustion volume inside said engine, having fuel/air mixture suction openings located under said internal piston space. In a preferred embodiment of the invention, at least one internal piston was formed which compresses the fuel/air mixture in front of it by rotating inside said internal piston space and transfers it to the external piston inner space. In a preferred embodiment of the invention, at least one external piston is formed which rotates in the opposite direction as the internal piston, and burns the fuel/air mixture in front of it and flushes the exhaust gas by rotating inside said external piston inner space. In this manner, an engine having a simpler mechanism is achieved. In this manner, an ignition engine was obtained with a more practical maintenance and repair.

REFERENCE NUMBERS

| | |
|---|---|
| 1 | Engine body |
| 1.1 | Gearbox cover |
| 1.2 | Oil ring |
| 1.3 | Oil intake |
| 1.4 | Coolant/lubricant intake |
| 1.5 | Seal |
| 2 | Engine cover |
| 2.1 | Coolant/lubricant exit |
| 2.2 | Coolant oil hole |

-continued

| | |
|---|---|
| 3 | Shuttle |
| 3.1 | Shuttle coolant oil intake-exit |
| 3.2 | Lubrication hole |
| 3.3 | Bearing |
| 3.4 | Oil passage ducts |
| 4 | External cylinder |
| 4.1 | Exhaust exit |
| 4.2 | Diesel type suction nozzle |
| 5 | External piston |
| 5.1 | Compression ring |
| 5.2 | Toothed rotation duct |
| 6 | Internal cylinder |
| 6.1 | Fuel/air intake |
| 6.2 | Diesel type exhaust nozzle |
| 7 | Internal piston |
| 8 | Small gearwheel |
| 8.1 | Top valve cap |
| 8.2 | Bottom valve cap |
| 8.3 | Spring |
| 9 | Coolant/lubricant fluid |
| 9.1 | Lubrication ring |
| 10 | Partition |
| 10.1 | Coolant intake |
| 11 | Axle |
| 11.1 | Oil coupling |
| 12 | Geared disk |
| 12.1 | Rotary wheel |
| 13 | Roller |
| 14 | Intermediate gear |
| 14.1 | Gear shaft |
| 15 | Spark-plug |
| 16 | Injector |
| 17 | Fuel/air mixture |
| 18 | Exhaust gas |
| A | Position of the valve cap starting to open |
| B | Position of the valve cap opened |
| C | Position of the valve cap closed |

DETAILED DESCRIPTION OF THE INVENTION

Figure 1:
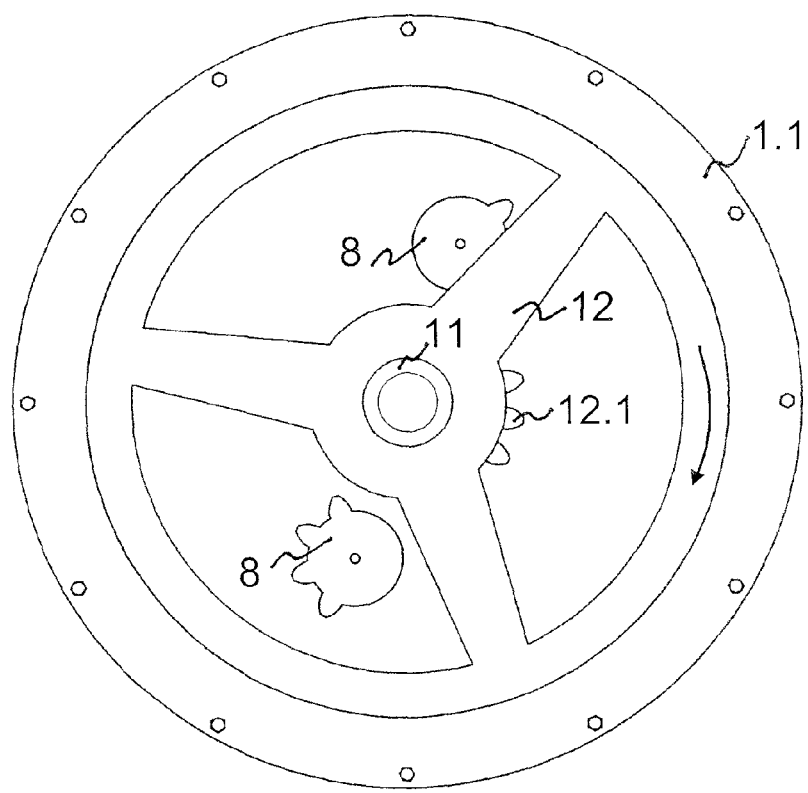
FIG. 1: The top view of the rotating engine in a representative application of the invention.
Figure 2:
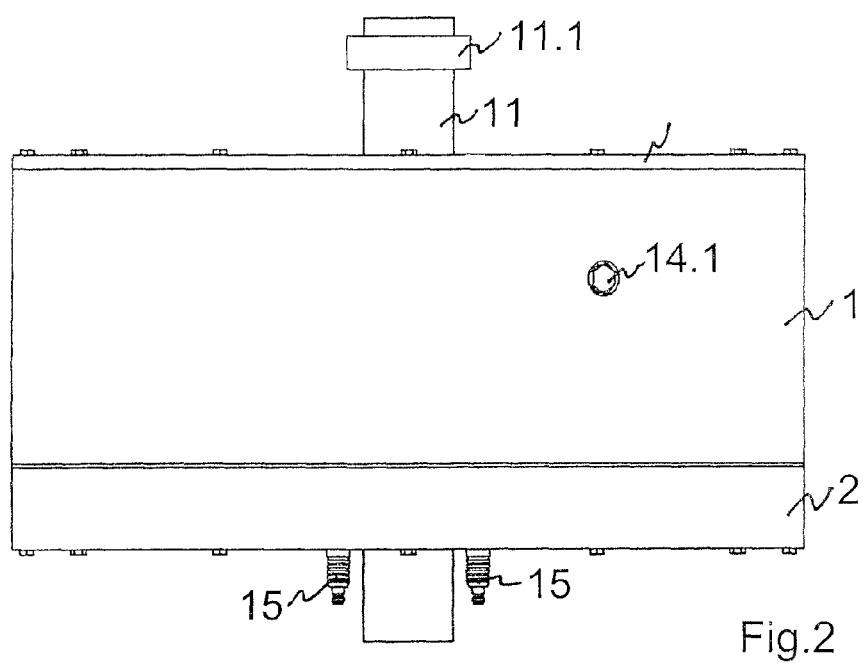
FIG. 2: The side view of the rotating engine in a representative application of the invention.
Figure 3:
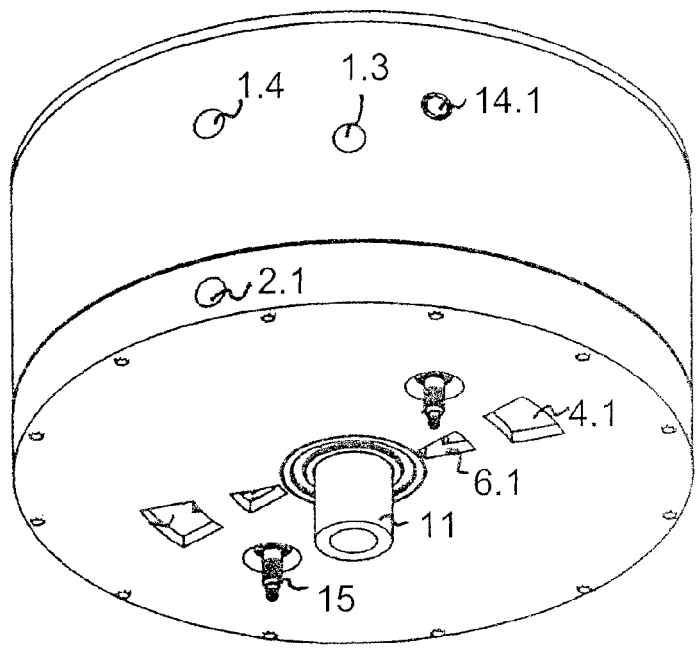
FIG. 3: The perspective view from the bottom of the rotating engine in a representative application of the invention.
Figure 8:
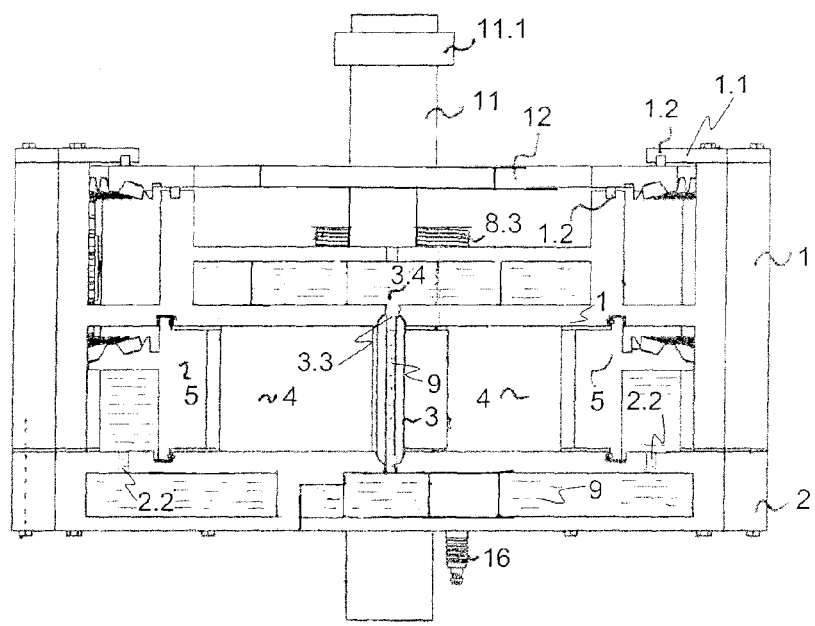
FIG. 8: The side sectional view of the lubrication line of rotating diesel engine in a representative application of the invention.

The implementation of the invention shown in the figures is the rotating, internal combustion gasoline or diesel engine cooled by air or oil. In FIGS. 1, 2, 3 and 4, general external appearances of the engine are given. In FIG. 2, lubrication cross-section of the inside of the engine is given for gasoline engine. In FIG. 8, lubrication cross-section of the inside of the engine is given for diesel engine.

Figure 13:
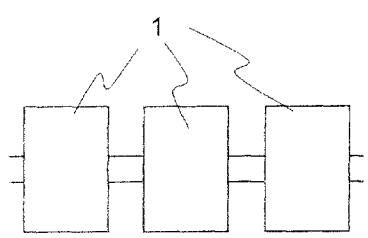
FIG. 13: The side view of the rotating engine ordered side by side in a representative application of the invention.

Body Components (1, 2);

Engine body consists of two parts. The engine body (1) and the engine cover (2). The to gearbox cover (1.1) is the cover where the engine is opened. The characteristic of the engine is that energy and power are generated via pistons (5, 6) of differing profiles rotating in the same angular and opposite directions. Inside the engine in the representative application given in the figures, two combustions occur in each cycle. Required power can be achieved with multiple engines connected to each other (FIG. 13). The engine, by general description, operates with two nested concentric spaces (4, 6) having equal widths and pistons (5, 7) that rotate in opposite directions inside them. The shuttle (3) moves forwards and backwards inside the spaces (4, 6) and is compressed in between the pistons (5, 7). There are valve caps (8.1, 8.2) catering for the combustion exhaust and combustion chamber during engine operation. Valve caps (8.1, 8.2) are rotated in a controlled manner via the small gearwheel (8), rotary wheel (12.1) and the spring (8.3) having special teeth profiles. Fittings are provided to circulate coolant/lubricant fluid (9) inside all surfaces including the axle (11) comprising the engine shaft.

Via an external piston inner space (4) having gear rotation ducts shown in FIGS. 5, 16, 10, 11 and 12, combustion and exhaust volumes inside the engine are provided. The sides of the external piston (5) are toothed. External piston (5), external piston inner space (4), internal piston (7) and internal piston space (6) are the principle components providing combustion and compression volumes inside the engine. The internal piston space (6) is positioned inside the external piston inner space (4). The internal piston space (6) has fuel/air mixture (17) and fuel/air intake (6.1) openings. The internal piston space (6) provides the suction and compression volumes inside the engine. The fuel/air mixture (17) pumped into the external piston inner space (4) burns in the external piston inner space (4) and is discharged from the exhaust exit (4.1) in the form of exhaust gas (18).

Figure 5:
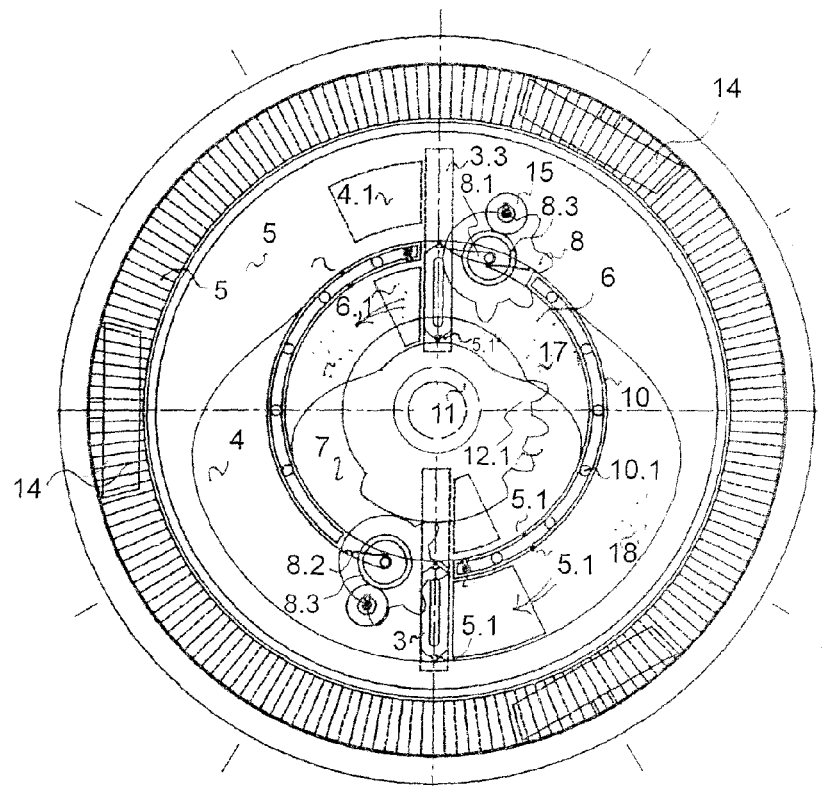
FIG. 5: The top view, without the cover, of the rotating gasoline engine in a representative application of the invention.
Figure 7:
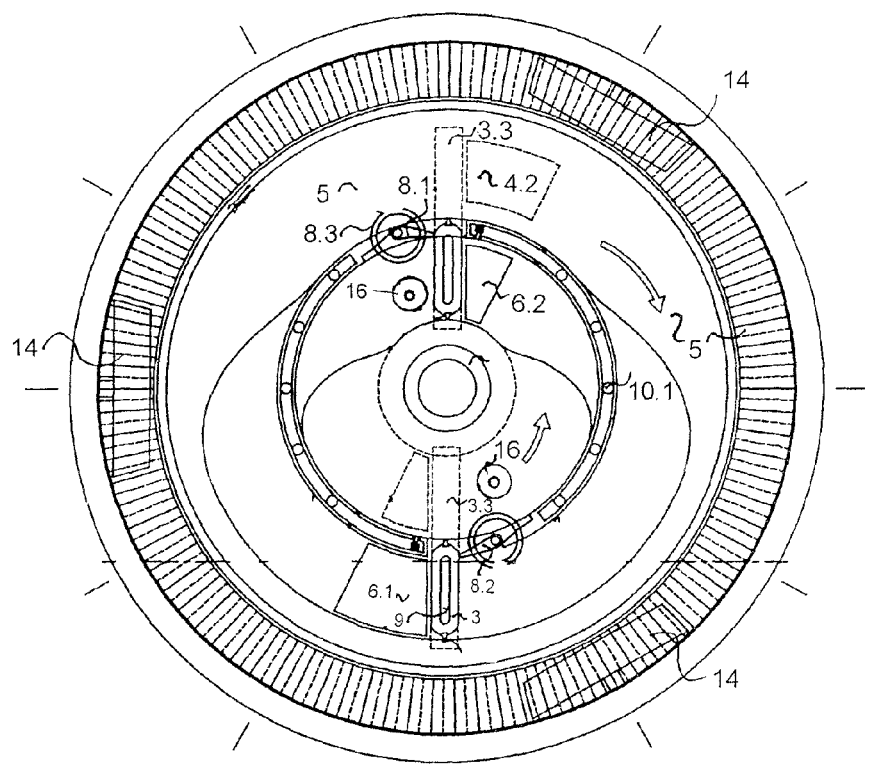
FIG. 7: The top view, without the cover, of the rotating diesel engine in a representative application of the invention.

Pistons (5, 7);

Compression and pumping to the external piston inner space (4) is carried out with an internal piston (7) which rotates inside the internal piston space (6) and compresses the fuel/air mixture (17) in front of it and pumps it to the external piston inner space (4). The fuel burning inside the external piston (5) and the external piston inner space (4) is discharged from the front face of the external piston inner space (4) and the exhaust exit (4.1). Combustion and exhaust is provided via an external piston (5) which rotates inside the external piston inner space (4) in the direction opposite to that of the internal piston (7) and flushes the exhaust gas (18) in front of it. The angular speed of the internal piston (7) and the external piston (5) are equal and their directions of rotation are opposite. The pistons rotate counterclockwise inside a hollow axle (11) passing through the "0" center and the internal piston (7) connected to it. The external piston (5) rotates in the opposite direction (clockwise) at the same rotational speed, with the aid of the gears on the external side of the external piston (5) via the geared disk (12) connected to the axle (11) and the intermediate gear (14) which it rotates. The internal piston (7) is the small piston; it operates inside the internal piston space (6) and performs compression. The internal piston (7) burns the air and fuel mixture coming into the internal piston space (6) and performs exhausting (FIGS. 5 and 7).

Figure 10:
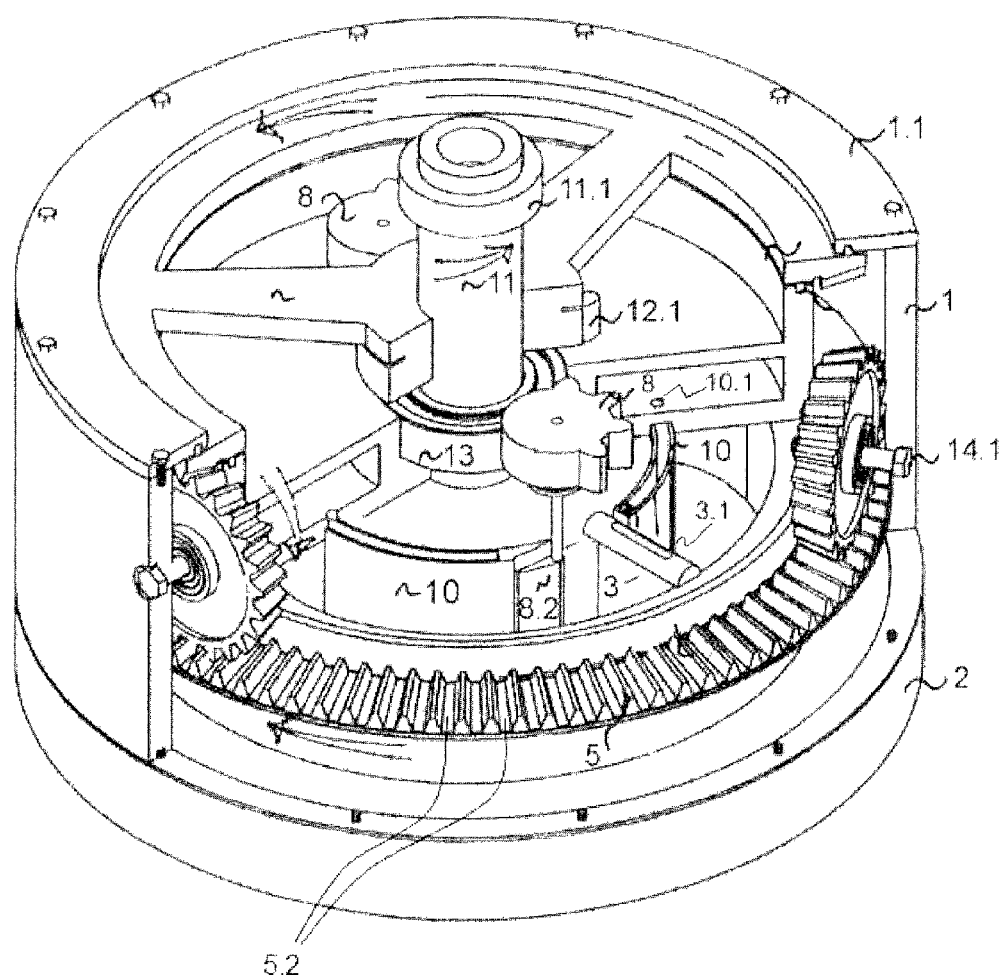
FIG. 10: The perspective sectional view of the rotating engine in a representative application of the invention.
Figure 11:
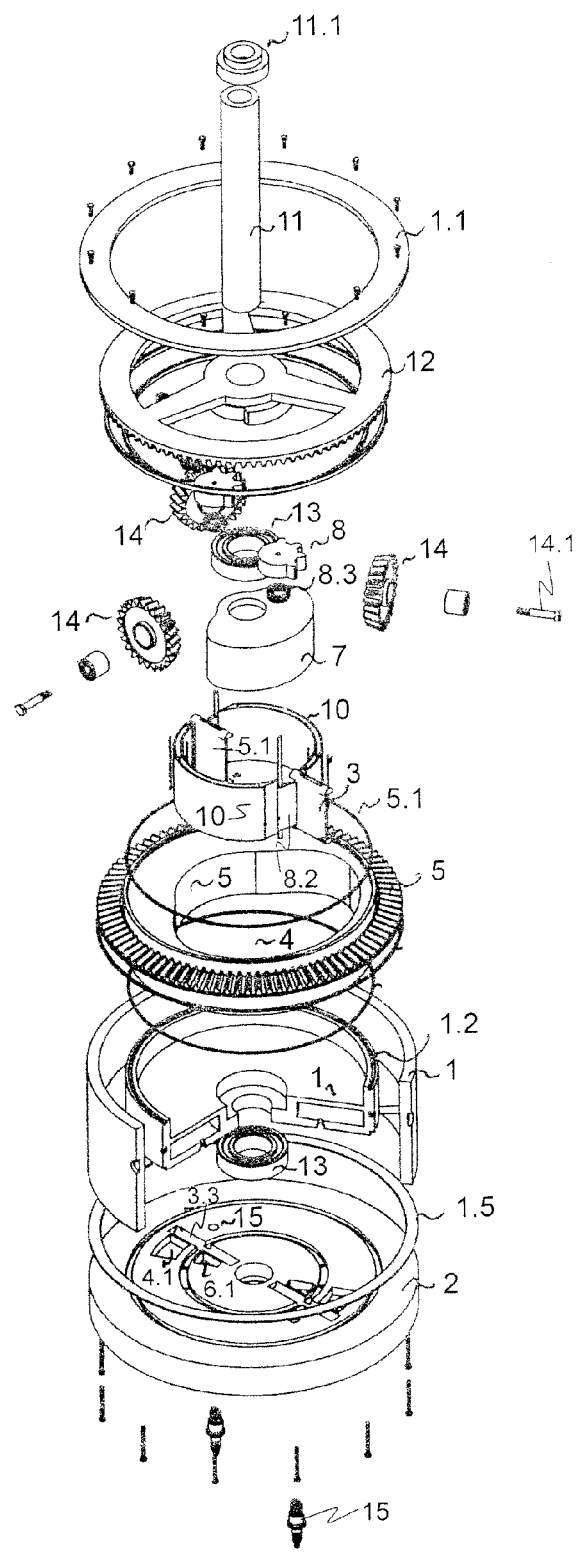
FIG. 11: The disassembled view of the rotating engine in a representative application of the invention.
Figure 12:
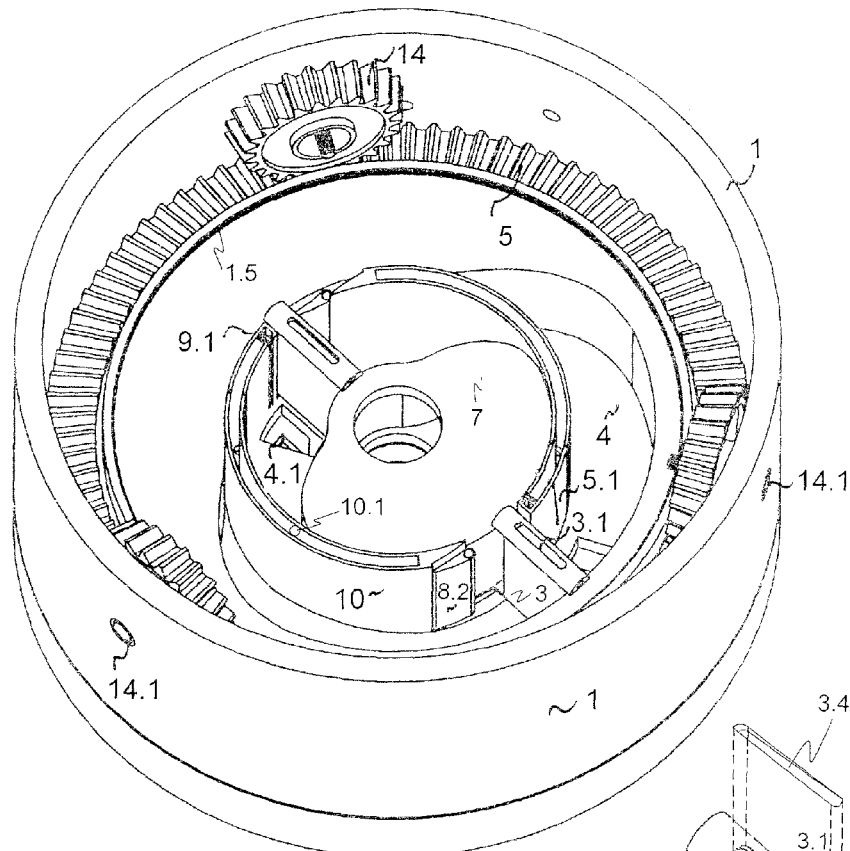
FIG. 12: The perspective view of the piston and gear group of the rotating engine in a representative application of the invention.
Figure 15:
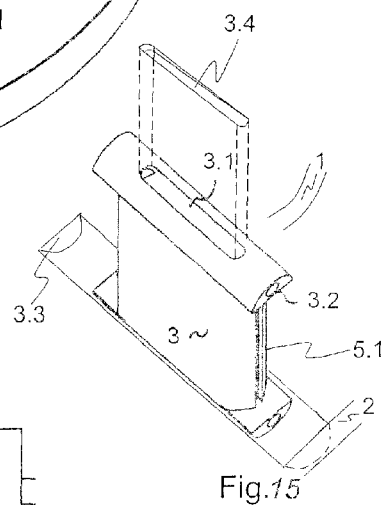
FIG. 15: The perspective view of the shuttle in a representative application of the invention.

Shuttle (3);

Shown in FIGS. 5, 10, 11 and 15 is the shuttle (3) which moves in between the spaces (4, 6) and acts as the combustion chamber wall. The lubricated surfaces of the external piston (5) and the internal piston (7) that are not in contact with the internal piston space (6) and the external piston inner space (4) have a geometry which push the shuttle (3) (FIG. 12). The bearing (3.3) which is fitted for lubrication and is in contact with the lubricated external surface of the internal piston (7) and the lubricated internal surface of the external piston (5) moves forwards and backwards inside (FIGS. 11 and 15). When the shuttle (3) enters the external piston inner space (4), it forms the combustion chamber together with the back face of the external piston inner space (4) and effects the combustion; with its front face it discharges the exhaust gas (18) out through the exhaust exit (4.1). When the shuttle (3) enters into the internal piston (7), it performs the fuel air suction with its rear face and compresses with its front face and pumps into the external piston inner space (4). The shuttle length is equal to the width of one of the spaces having equal widths (4 or 6)+the thickness of the partition. The piston profiles are fabricated by finding the shapes to provide for sealing using the cam curves technique. With a bearing (3.3) which bears the shuttle (3) and is formed inside the inner body, the shuttle (3) is made to move on the engine cover (2). The shuttle (3) bearing (3.3) is lubricated with a multiple number of lubrication holes (3.2) formed on the sides of the shuttle (3). With this lubricant, the contact surfaces of the external piston inner space (4) and the internal piston (7) are lubricated. Through a shuttle coolant hole intake-exit (3.1) formed on the top or the bottom face of the shuttle (3), the coolant/lubricant fluid (9) is made to pass on the shuttle (3). The shuttle (3) is cooled with the coolant/lubricant fluid (9) (FIG. 8). Via the oil passage ducts (3.4) on the engine body (1) and the engine cover (2.2), the coolant/lubricant fluid (9) enters and exits the inside of the shuttle (3).

Compression:

The internal piston (7) compresses the fuel/air mixture (17) it has sucked in with its front face (FIG. 5). As seen, the large rotary wheel (12.1) connected to the internal piston (7) pushes the small gearwheel (8) which is kept closed with the spring (8.3) and opens the top valve cap (8.1). The fuel/air mixture (17) fills into the external piston inner space (4) with the suction of the external piston (5) and the pushing of the internal piston (7) and the explosion takes place. In the meantime the internal piston (7) has closed the gap that the top valve cap (8.1) has opened. The external piston (5) is pushed. The internal piston (7) continues to rotate (FIG. 9c). Shortly, the small gearwheel (8) is freed from the rotary wheel (12.1) and the spring (referred to as the hole+valve cap (8.1, 8.2)) closes the valve. The figure is fully symmetrical. Two explosions take place in one cycle.

The movement is transferred with an axle (11) that rotates the internal piston (7) and through which the coolant/lubricant fluid (9) moves. The external piston (5) is rotated with the intermediate gear (14). The intermediate gear (14) is located in between the two gears. The intermediate gear (14) is turned with a geared disk (12) connected with the axle (11). The gear shaft (14.1) is the shaft which turns the intermediate gear (14). The oil intake (1.3) is lubrication intake for the intermediate gear (14).

Figure 16:
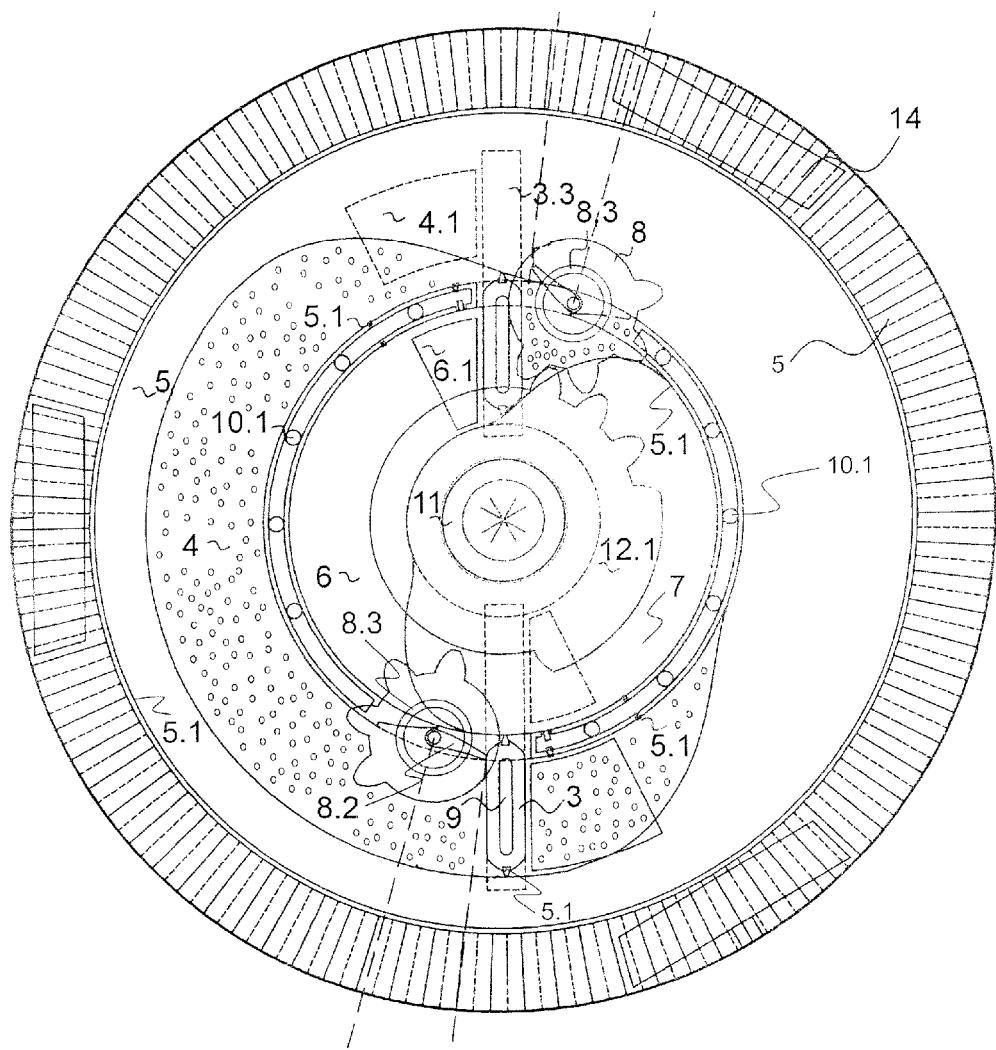
FIG. 16: The top view of the piston and gear group of the rotating engine in a representative application of the invention.

Valve Caps (8.1, 8.2) in FIG. 16 and FIG. 19:

Opening and closing is provided between the spaces (4, 6) with the top valve cap (8.1) connected to one of the internal piston space (6) openings. Opening and closing is provided between the spaces (4, 6) with the bottom valve cap (8.2) connected to one of the internal piston space (6) openings. Opening and closing of the top valve cap (8.1) is provided via a small gearwheel (8) connected to the top valve cap (8.1) and having toothed and smooth edges, located at the edges of the motion timing. Opening and closing of the bottom valve cap (8.2) is provided via a small gearwheel (8) connected to the bottom valve cap (8.2) and having toothed and smooth edges, located at the edges of the motion timing. With a spring (8.3) connected to the small gearwheel (8), the small gearwheel (8) is made to take its initial position at the end of the rotation. The spring (8.3) is connected to the valve caps (8.1, 8.2). When the small gearwheel (8) turns the valve caps (8.1, 8.2) it also winds the spring (8.3). The valve caps (8.1, 8.2) are two in number (FIGS. 5, 7, 8, 10, 11, 12). It moves between the internal piston space (6) and the external piston inner space (4). It is on the two opposite edges. It provides the fuel from mixing with exhaust gasses. The rotation is actuated with a rotary wheel (12.1) moving the small gearwheel (8) which has toothed and smooth edges and adjusted with the gear housings located on the motion timing edges and connected to the geared disk (12).

Figure 6:
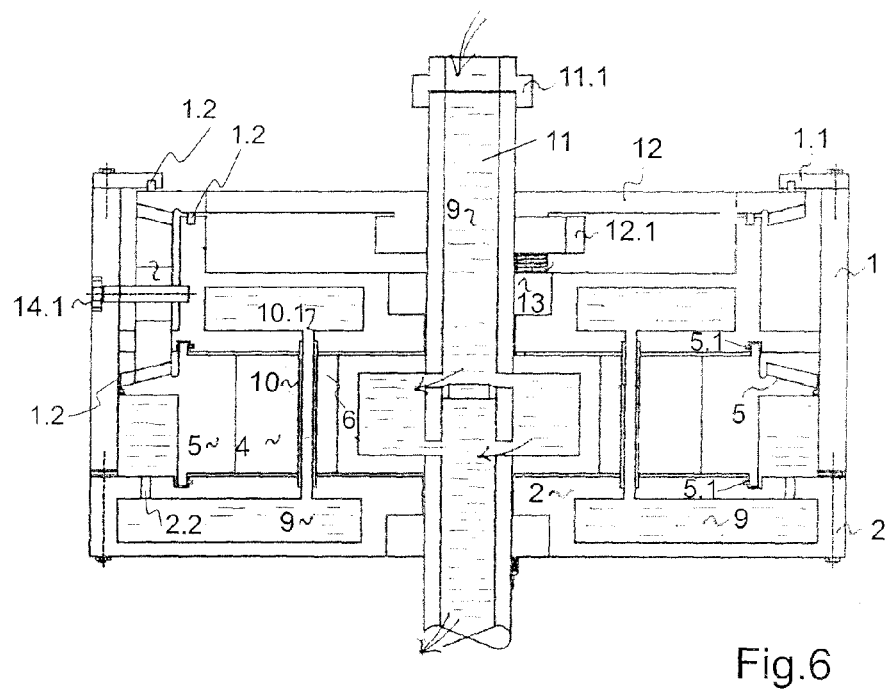
FIG. 6: The side sectional view of the lubrication line of rotating gasoline engine in a representative application of the invention.

Lubrication and Cooling (FIG. 6,8)

Figure 14:
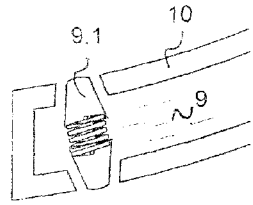
FIG. 14: The sectional view of the lubricating ring in a representative application of the invention.

Cooling is provided with a partition (10) formed inside the side surfaces of the internal piston space (6) and enables the passage of the coolant/lubricant fluid (9). Cooling is provided with multiple coolant intakes (10.1) formed inside the partition (10) and enable the passage of the coolant/lubricant fluid (9). The coolant intakes (10.1) are the ducts located inside the internal piston space (6) and external piston inner space (4) partition (10) (FIG. 5). The coolant/lubricant fluid (9) comes both from the inside of the axle (11) and the coolant/lubricant intake (1.4). The coolant/lubricant fluid (9) passes through the coolant/lubricant intake (1.4) and the coolant/lubricant exit (2.1). The external surfaces of the pistons (5, 7) are lubricated while rotating, via the lubrication ring (9.1). The lubrication ring (9.1) slides in the partition (10) with the contact of the pistons (5, 7) to enable the flow of the coolant/lubricant fluid (9). With the contact of the pistons (5, 7) is broken, it comes to its initial position and cuts the flow (FIG. 14). The lubrication ring (9.1) is the ring lubricating the pistons (5, 7) (FIG. 14). With the pistons (5, 7) coming in contact the lubrication ring (9.1) moves inwards and the coolant/lubricant fluid (9) lubricates the contact surfaces of the pistons (5, 7). In the event the contact of the pistons (5, 7) with the lubrication ring (9.1) is broken, the lubrication ring (9.1) assumes its initial position and stops the flow of the coolant/lubricant fluid (9).

With the coolant/lubricant fluid (9) (oil) in the shuttle (3) bearing (3.3) (FIG. 15) the side surfaces are both lubricated and cooled (FIG. 5, 6). With an oil coupling (11.1) connected to the end of the axle (11), the leakage of the coolant/lubricant fluid (9) inside the axle (11) to the outside of the engine body (1) is prevented. The lubrication ring (1.2) is for the rotating axle (11) and the non-rotating oil pipe. The coolant/lubricant fluid (9) (FIG. 14) in the bearing (3.3) (FIG. 5) provide for the lubrication of the side surfaces of the pistons (5, 7). The bearing (3.3) also lubricates the shuttle (3) movement face. The oil coupling (11.1) is the coolant/lubricant fluid (9) coupling connected to the axle (11). The coolant/lubricant fluid (9) (cooling oil) both comes from the inside of the axle (ii) and cools the internal piston (7) and at the same time comes from the coolant/lubricant intake (1.4) and cools the engine body (1) and the engine cover (2) and then exists through the coolant/lubricant exit (2.1).

The shuttle coolant hole intake-exit (3.1) is on the top section of the shuttle (3). The lubrication hole (3.2) provides for the lubrication of the bearing (3.3) via the shuttle (3) (FIG. 15). The surface on which the lubrication holes (3.2) are located has a protruding structure on the bottom and top edges as compared to the shuttle (3) body. The protruding edges prevent leakage into the spaces (4, 6) from the contact surfaces. (FIG. 10).

The flow of oil into the shuttle coolant hole intake-exit (3.1) is provided for with the oil passage ducts (3.4) formed on the top and bottom surfaces of the shuttle, the engine body (1), the engine cover (2.2) (FIG. 8) and the spaces (4, 6). The flow is made through the open oil passage ducts (3.4) on the body (1) and the cover (2).

The lubrication ring (1.2) (FIG. 11) is the ring for the coolant/lubricant fluid (9) on the intermediate gear (14) (FIG. 6).

Sealing:

Because the engine rotates on a single axis, the gap in between the pistons (5, 7) and the spaces (4, 6) is left as much as the expansion and oil thickness.

With a lubrication ring (9.1) which is positioned inside the partition (10) shown in FIG. 14 and which has a spring mechanism to slide inside upon contact, the internal surfaces of the external piston (5) and the internal piston (7) are lubricated.

For gasoline type engines (FIG. 5):

The spark-plug (15) is at the positions shown in FIG. 5 (gasoline type) and the injector (16) as shown in FIG. 7 (diesel type). In FIG. 5 the fuel/air intake (6.1), the fuel/air mixture (17), the exhaust exit (4.1) and the exhaust gas (18) are shown.

It comprises two nested concentric equal width spaces (4, 6), and two pistons (5, 7) within the same that have different profiles and rotate in opposite directions at the same angular speed, with two shuttles (3) traveling on a bearing (3.3) encased by them. In the event the fuel/air mixture (17) shown in FIG. 5 is a gasoline mixture there is a fuel/air intake (6.1) located under the internal piston space (6). In the event the fuel/air mixture (17) is a gasoline mixture there is an exhaust exit (4.1) located under the external piston inner space (4). In the event the fuel/air mixture (17) shown in FIG. 5 is gasoline/air there are two spark-plugs (15) located under the external piston inner space (4).

Diesel Engine (FIG. 7):

Efficiency increases because compression volume is small and the combustion volume is large (same as the compound system in steam engines). Because the compression is high, valve caps (8.1, 8.2) open and close only by the action of the spring (8.3) and the compression. In the event the fuel is diesel, there is a diesel type exhaust nozzle (6.2) located under the internal piston space (6). In the event the fuel is diesel, there is a diesel type suction nozzle (4.2) located under the external piston inner space (4).

In the event the fuel is diesel, there are two injectors (16) located under the internal piston space (6).

Figure 4:
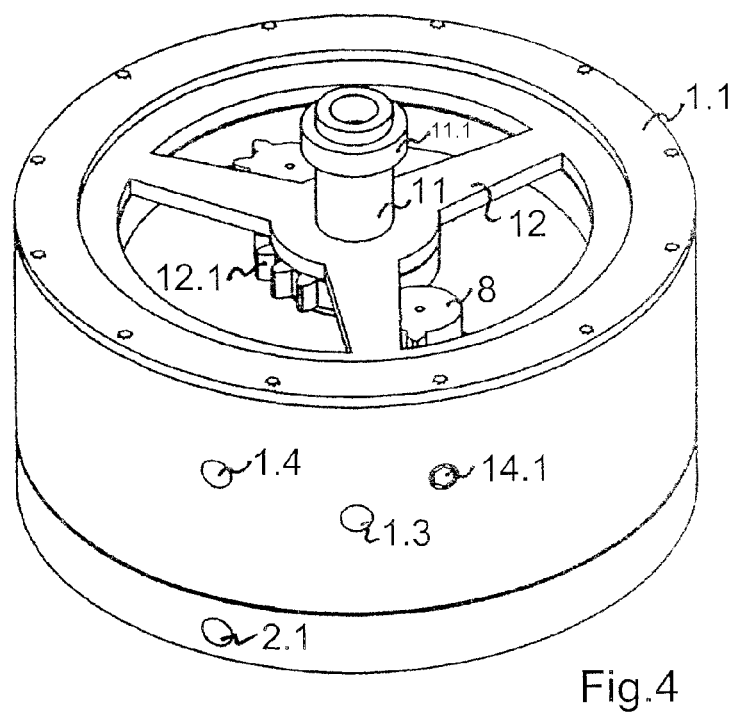
FIG. 4: The top view of the rotating engine in a representative application of the invention.

There is an oil intake (1.3) on the engine body (1) shown in FIG. 4. There is the coolant/lubricant intake (1.4) on the engine body (1). The seal (1.5) is firmly attached with a pin in between the engine body (1) and the engine cover (2) (FIG. 11).

Illustration of the operation of the engine in a cycle (FIGS. 9a, 9b, 9c, 9d, 9e, 9f, 9g, 9h, 9i, 9j, 9k, 9l);

The figures given are the 12 different positions of 30° turns each from the stop. The figures show the positions of the valve caps (8.1, 8.2) and pistons (5, 7) at every 30° turn.

Figure 9A:
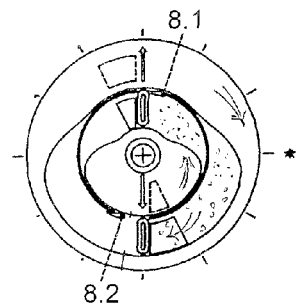
FIG. 9a: The view of the engine, in stationary form, in a representative application of the invention.

FIG. 9a is a representative start position. The center of the external piston (5) shows 0° and the center of the internal piston (7) shows 180°.

Figure 9B:
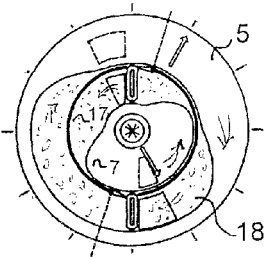
FIG. 9b: The view of engine pistons rotated by 30° in a representative application of the invention.
Figure 9C:
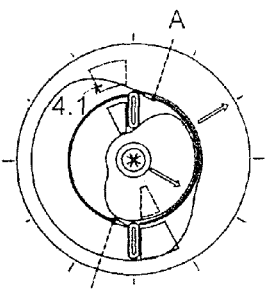
FIG. 9c: The view of engine pistons rotated by 60° in a representative application of the invention.

The pistons (5, 7) given in FIG. 9b have turned in their respective directions. The internal piston (7) pushes the fuel/air mixture (17) in front of it towards the top valve cap (8.1). The bottom valve cap (8.2) is closed.

In FIG. 9c, the internal piston (7) compresses the fuel/air mixture (17) towards the top valve cap (8.1). The top valve cap (8.1) starts to open (A). The geared external piston (5) expels burnt exhaust gases (18). The bottom valve cap (8.2) is closed.

Figure 9D:
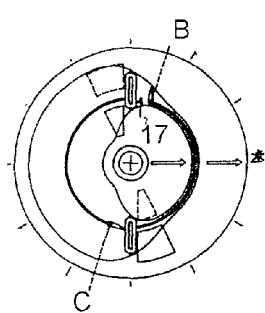
FIG. 9d: The view of engine pistons rotated by 90° in a representative application of the invention.

In FIG. 9d, the internal piston (7) pumps the fuel/air mixture (17) into the external piston inner space (4). The combustion occurs when the top valve cap (8.1) is in open position. The combustion occurs in the narrow triangular area remaining in between the top valve cap (8.1) and the shuttle (3) external piston inner space (4) side faces. The internal piston (7) covers the top valve cap (8.1). The bottom valve cap (8.2) is closed.

Figure 9E:
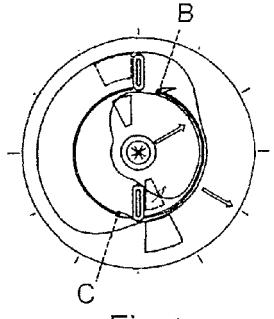
FIG. 9e: The view of engine pistons rotated by 120° in a representative application of the invention.

In FIG. 9e, the internal piston (7) and the external piston inner space (4) continue to keep the bottom valve cap (8.2) closed. The top valve cap (8.1) is open (B). In the external piston inner space (4) gasses continue to push the geared external piston (5). The bottom valve cap (8.2) is closed. The capable of is kept closed by the spring (8.3).

Figure 9F:
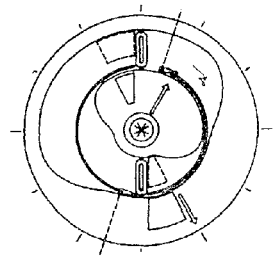
FIG. 9f: The view of engine pistons rotated by 150° in a representative application of the invention.

In FIG. 9f, the movement continues, the top valve cap (8.1) is open and the bottom valve cap (8.2) is closed.

Figure 9G:
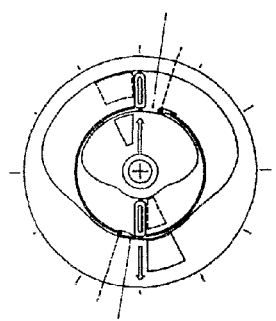
FIG. 9g: The view of engine pistons rotated by 180° in a representative application of the invention.

In FIG. 9g, the movement continues, the top valve cap (8.1) is open and the bottom valve cap (8.2) is closed.

Figure 9H:
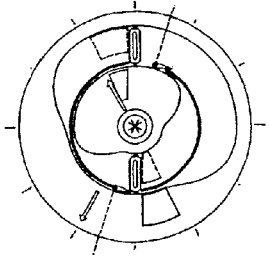
FIG. 9h: The view of engine pistons rotated by 210° in a representative application of the invention.

In FIG. 9h, the movement continues, the top valve cap (8.1) is open and the bottom valve cap (8.2) is closed.

Figure 9I:
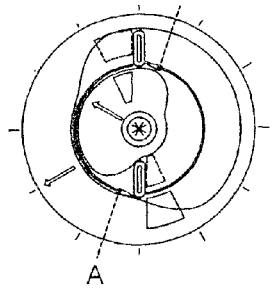
FIG. 9i: The view of engine pistons rotated by 240° in a representative application of the invention.

In FIG. 9i, the spring (8.3) pulls the top valve cap (8.1) to open the internal piston (7) bottom valve cap (8.2). The top valve cap (8.1) is closed. The internal piston (7) is about to open the bottom valve cap (8.2) (A).

Figure 9J:
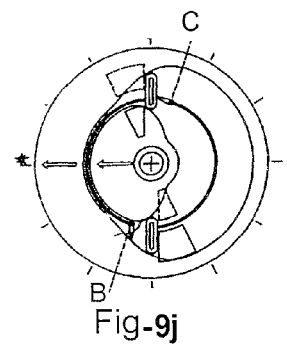
FIG. 9j: The view of engine pistons rotated by 270° in a representative application of the invention.

In FIG. 9j, the internal piston (7) opens the bottom valve cap (8.2). The fuel/air mixture (17) is pumped into the external piston inner space (4) and the combustion occurs. (As shown in the figure, one combustion occurs during rotation at every 180° with the engine components in symmetrical position).

Figure 9K:
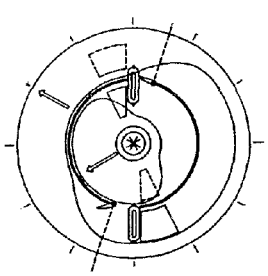
FIG. 9k: The view of engine pistons rotated by 300° in a representative application of the invention.

In FIG. 9k, the internal piston (7) sucks in the fuel/air mixture (17) with its rear face. The bottom valve cap (8.2) is closed. Thus, the exhaust gas (18) and the fuel/air mixture (17) do not mix. The internal piston (7) starts to compress with its front face. The top valve cap (8.1) is closed.

Figure 9L:
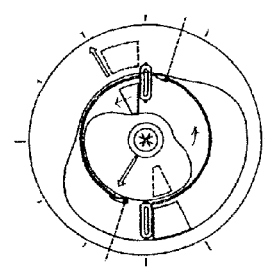
FIG. 9l: The view of engine pistons rotated by 330° in a representative application of the invention.

In FIG. 9l, the internal piston (7) produces suction with its rear surface and compression with its front surface. The bottom valve cap (8.2) is open. The ground external piston (5) pushes the exhaust gas (18). The bottom valve cap (8.2) is open. Exhaust gases (18) continue to push the piston (5, 7).

This invention relates to a rotating internal combustion engine providing high speed and power by enabling two combustions in one cycle. Because it is possible, due to it being small, to connect 1, 2, 3 engines on the same axle, both an economic and a powerful high speed engine is obtained as required (FIG. 13).

This invention may not be limited to the representative embodiments provided in this section. Alternative embodiments which may be realized by the persons skilled in the art on the basis of the fundamental elements within the protective state as set forth in the claims shall mean the violation of the invention.

The invention claimed is:

1. A rotating internal combustion engine which converts a fuel/air mixture into energy and comprises:
   coolant/lubricant fluid flow ducts, cooled by air or oil,
   at least one ignition engine body, and
   at least one engine cover connected to said engine body, wherein the rotating internal combustion engine further comprises;
   at least one external piston rotating inside said ignition engine body, having toothed rotation ducts in order to provide a rotational movement, said external piston providing combustion and exhaust volumes inside said engine body together with a partition and flushing exhaust gas by rotation of said external piston, and
   at least one internal piston which rotates inside said partition in a direction opposite to a rotational movement direction of said external piston, said internal piston providing suction and compression volumes inside said partition, compressing the fuel/air mixture by rotation and pumping into an external piston inner space,
   at least one fuel/air intake located under an internal piston space,
   at least one exhaust exit located under said external piston inner space,
   at least one axle rotating said internal piston and in which the coolant/lubricant fluid moves,
   at least one intermediate gear rotating said external piston,
   at least one geared disk connected to said axle and turning said intermediate gear,
   at least one shuttle moving in between the internal and external inner piston spaces and acting as combustion chamber wall,
   at least one top valve cap and at least one bottom valve cap each connected to an opening to said internal piston space,
   at least one small gearwheel opening and closing said top valve cap and connected to said top valve cap,
   at least one small gearwheel opening and closing said bottom valve cap and connected to said bottom valve cap,
   at least one rotary wheel moving said small gearwheels and which is connected to said geared disk,
   at least one spring which enables each said small gearwheel to assume an initial position at the completion of turn and is connected to said small gearwheel.

2. The rotating internal combustion engine according to claim 1, wherein the surfaces of said internal piston which are not in contact with the internal piston space have a geometry which pushes against the shuttle.

3. The rotating internal combustion engine according to claim 1, wherein the rotating internal combustion engine further comprises: at least one partition formed inside side surfaces of internal piston inner space and provides for the passage of the coolant/lubricant fluid.

4. The rotating internal combustion engine according to claim 1, wherein the rotating internal combustion engine further comprises: a multiple number of coolant intakes formed inside said partition and enable the passage of the coolant/lubricant fluid.

5. The rotating internal combustion engine according to claim 1, wherein the rotating internal combustion engine further comprises: at least one oil coupling connected to an end of said axle.

6. The rotating internal combustion engine according to claim 1, wherein the rotating internal combustion engine further comprises: at least two bearings formed in an inner section of said engine cover and bearing said shuttle.

7. The rotating internal combustion engine according to claim 1, wherein the rotating internal combustion engine further comprises: a multiple number of lubrication holes formed on sides of said shuttle.

8. The rotating internal combustion engine according to claim 1, wherein the rotating internal combustion engine further comprises: at least one shuttle coolant hole intake-exit formed on top and bottom surfaces of said shuttle, and which provide for passage of the coolant/lubricant fluid into said shuttle.

9. The rotating internal combustion engine according to claim 1, wherein the rotating internal combustion engine further comprises: at least two spark-plugs located under said external piston inner space in the event said fuel/air mixture is gasoline/air.

10. The rotating internal combustion engine according to claim 1, wherein the rotating internal combustion engine further comprises: at least two injectors located under said internal piston space in the event fuel is diesel.

11. The rotating internal combustion engine according to claim 1, wherein it comprises at least one lubrication ring having a spring mechanism sliding in upon contact and located inside said partition and lubricating the internal surfaces of said external piston and the internal piston.

12. The rotating internal combustion engine according to claim 1, wherein the rotating internal combustion engine further comprises: at least one oil intake on said engine body.

13. The rotating internal combustion engine according to claim 1, wherein the rotating internal combustion engine further comprises: coolant/lubricant intake on said engine body.

14. A rotating internal combustion engine which converts the diesel fuel into energy and comprises:
   coolant/lubricant fluid flow ducts, cooled by air or oil,
   at least one ignition engine body, and at least one engine cover connected to said engine body, wherein the rotating internal combustion engine further comprises;

at least one external piston rotating inside said ignition engine body, having toothed rotation ducts in order to provide a rotational movement, providing suction and compression volumes inside said engine body together with a partition and compressing air by rotation and pumps into an internal piston space, and at least one internal piston, providing combustion and exhaust volumes inside said partition and flushing the exhaust gas in front of it by rotation of said internal piston, at least one diesel type exhaust nozzle located under said internal piston space, at least one diesel type suction nozzle located under an external piston inner space, at least one axle rotating said internal piston and in which the coolant/lubricant fluid moves, at least one intermediate gear rotating said external piston, at least one geared disk connected to said axle and turning said intermediate gear, at least one shuttle moving in between the internal and external piston inner spaces and acting as a combustion chamber wall, at least one top valve cap connected to an internal piston space opening, at least one bottom valve cap connected to an internal piston space opening, at least one small gearwheel opening and closing said top valve cap and connected to said top valve cap, at least one small gearwheel opening and closing said bottom valve cap and connected to bottom valve cap, at least one rotary wheel moving said small gearwheels and which is connected to geared disk, and at least one spring which enables each said small gearwheel to assume an initial position at the completion of turn and is connected to said small gearwheel.

* * * * *